United States Patent [19]

Wagner

[11] Patent Number: 5,685,501
[45] Date of Patent: Nov. 11, 1997

[54] PORTABLE ELECTRIC SPICE MILL

[76] Inventor: Dianne Marie Wagner, 10228 Shireoaks La., Boca Raton, Fla. 33498

[21] Appl. No.: 692,912

[22] Filed: Jul. 26, 1996

[51] Int. Cl.⁶ .................................................. A47J 42/36
[52] U.S. Cl. ...................... 241/169.1; 241/273.3; 241/168
[58] Field of Search ...................... 241/169.1, 168, 241/273.3, 258

[56] References Cited

U.S. PATENT DOCUMENTS

| | | | |
|---|---|---|---|
| 3,734,417 | 5/1973 | Russel et al. | 241/168 |
| 4,685,625 | 8/1987 | Mazza | 241/169.1 X |
| 4,925,150 | 5/1990 | Todieli | 241/169.1 |
| 5,022,591 | 6/1991 | Sanders | 241/169.1 |
| 5,082,190 | 1/1992 | Chen | 241/169.1 |
| 5,201,474 | 4/1993 | Midden | 241/258 X |
| 5,435,237 | 7/1995 | Huang | 241/273.3 X |

FOREIGN PATENT DOCUMENTS

| | | | |
|---|---|---|---|
| 0 278 234 | 8/1988 | European Pat. Off. | 241/169.1 |
| 30 03 931 | 8/1981 | Germany | 241/169.1 |

*Primary Examiner*—John M. Husar
*Assistant Examiner*—Julie A. Krolikowski
*Attorney, Agent, or Firm*—Ronald V. Davidge

[57] ABSTRACT

A portable electric spice mill is configured to be easily carried in a pocket or purse, having a grating wheel turning with a drive shaft extending perpendicularly to a motor shaft extending from a motor powered by a battery. These shafts are connected by a pair of gears. The grating wheel turns within a hopper supplying spices for grating, being disposed above a plate including a number of holes through which grated spices flow. A rear cover forms a battery compartment and a portion of the walls of the hopper, while an intermediate plate forms the remaining portion of these walls. A front cover extends around the motor and an electric switch, which is closed by the depression of a button to begin and maintain operation of the motor.

18 Claims, 3 Drawing Sheets

PORTABLE ELECTRIC SPICE MILL

BACKGROUND OF THE INVENTION

1. Field of the Invention

This invention relates to a motor-driven device for grating pepper and other spices, and, more particularly, to such a device formed in a configuration which is easily carried in a pocket or purse.

2. Background Information

Many people enjoy the rich taste of freshly-ground pepper and other spices on food prepared at home or in restaurants. While many restaurants have large, partly ornamental pepper mills which are manually operated by a waiter, a number of restaurants do not provide freshly-ground pepper. While both manually and electrically-operated pepper mills are available, they cannot be carried about without a significant degree of difficulty.

What is needed is a pepper mill which can be easily carried around in a pocket or purse. Such a device could easily be brought into a restaurant, making it unnecessary for the diner to rely on the restaurant to supply pepper in his preferred form. Furthermore, such a device could easily be used to provide freshly ground spices other than pepper, and mixtures of spices. For example, a diner could carry his favorite combination of spices in a suitable mill, or a restaurant could provide a number of different spices or combinations thereof in a number of small, portable mills.

3. Description of the Prior Art

Battery-operated, motor-driven pepper mills are described, for example, in U.S. Pat. Nos. 3,734,417, 4,925,150, and 5,022,591.

The pepper mill of U.S. Pat. No. 3,734,417 is provided in the form of an elongated body having a base incorporating batteries, a motor, and gear reduction means for operating a rotor grinder disposed in the top portion of the body. A tilt switch is incorporated so that the motor is only operated when the body is tilted to position the top lower than the base, so that ground pepper can pass from the lowered top of the body. When this large, rechargeable pepper grinder is not in used, it is preferably placed upright, with the top extending upward, in a battery charger unit, which is plugged into a conventional electrical outlet for recharging the battery within the base of the pepper mill.

The grinding device of U.S. Pat. No. 4,925,150, which is particularly for grinding pepper or salt grains, comprises a container for the grains, a grinder positioned on the bottom of the container, a battery-operated electric motor, a reduction unit with a high gear ratio, and a drive shaft connecting the reduction unit to the grinder and crossing the container. The device is formed of two disengageable bodies, one of which consists of a motor unit comprising the motor, the reduction unit, the battery, and a control push-button, and the other of which consists of a container having a rotary grinder mounted on its bottom, one end of the drive shaft being fixedly connected to the grinder. In the device, the other end of the drive shaft and, respectively, the outlet gear of the reduction unit have reciprocal connection means apt to be disengaged.

The cordless pepper mill of U.S. Pat. No. 5,022,591 has an elongated housing enclosing a rotary mill, a gear reduction unit having an output shaft connected to the mill, a motor having an output shaft connected to the gear reduction unit, a rechargeable battery for driving the motor, and a switch for selectively connecting the battery to the motor. The housing has a cylindrical end portion dimensioned for frictional engagement within a cylindrical recess formed in a top surface of a recharging unit. Cooperating electrical contacts within the recess and on the housing are engageable to provide a recharging current to the rechargeable battery within the housing. The actuating switch is a push-button switch spring biased to an off position, disposed on a top end wall of the housing for convenient access. The rotary grinding mill has a frusto conical shape and is provided with a plurality of circumferentially spaced alternating trapezoidal lands and trapezoidal flutes. The mill is mounted for rotation in an oppositely tapering frusto conical seat with a minimum clearance space.

These prior-art examples of battery-operated, electrically-driven pepper mills are each quite large, being of substantial diameter, and being vertically extended to simulate the appearance of a traditionally ornamental, manually operated pepper mill. It is reasonable to assume that a relatively large size was originally required to obtain sufficient torque for grinding through manual twisting of opposing sections of a pepper mill in the absence of a crank. The ornamental nature of manual pepper mills was subsequently enhanced by enlarging them beyond their necessary size, particularly by increasing their length. Then, battery-operated, electrically-driven pepper mills were developed, emulating the appearance of the large, elongated, manually-operated devices, somewhat in the manner that early automobiles looked more line horse-drawn carriages than like modern automobiles. Thus, these examples from the prior art do not address the need for a pepper mill which can be easily carried in the pocket or purse.

Furthermore, each of these prior-art pepper mills includes a fluted rotor turning within a stator in a manner that generally crushes peppercorns. While this is an effective way to produce ground pepper, it uses considerable electrical energy. This level of energy usage is easily supported in a large, table-top rechargeable device such as one of these units of the prior art, but it is not easily supported in a device configured to be transported in pocket or purse, which is preferably powered by a small battery, such as a single AA-size cell. Therefore, what is needed is a portable electric pepper mill employing a more efficient means for grating, or shaving away, portions of peppercorns or other spices.

SUMMARY OF THE INVENTION

In accordance with one aspect of the invention, there is provided a portable spice mill including a battery, a manually operated electric switch electrically connected to the battery, a wheel for grating spices, a hopper holding spices and supplying them to the wheel, and a housing. The motor is powered by the battery when contacts within the electric switch are held together. The motor includes an output shaft extending outward in a first direction from an end of the motor, with a drive gear attached to the output shaft. The wheel is attached to a drive shaft having a driven gear meshing with the drive gear of the motor. The drive shaft extends to the wheel in a second direction, which is perpendicular to the first direction.

DETAILED DESCRIPTION

Figure 1:
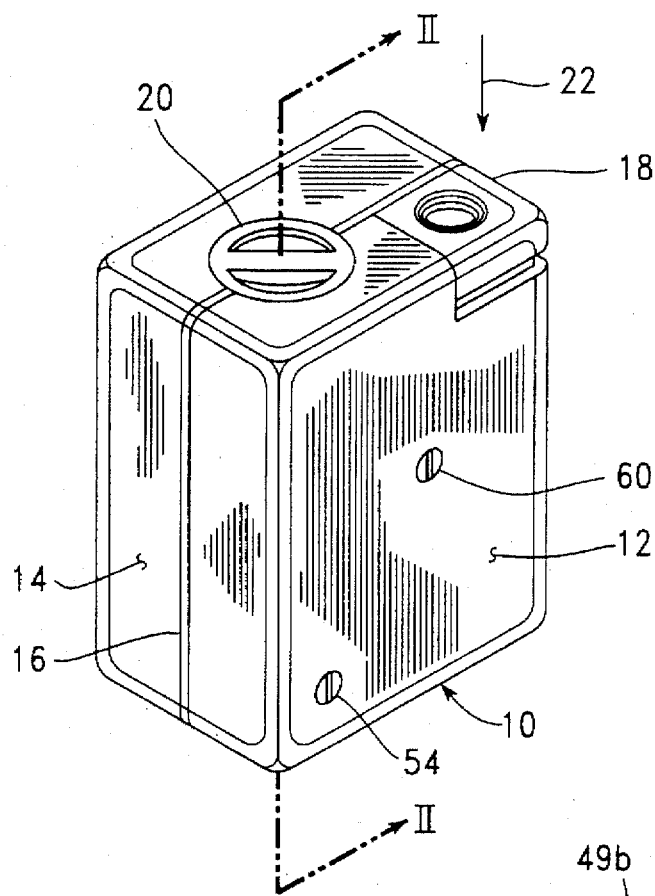
FIG. 1 is an isometric view of a spice mill built in accordance with the present invention.

FIG. 1 is an isometric view of a spice mill 10 built in accordance with the present invention. Principle external structures of the spice mill 10, each of which is preferably molded from a thermoplastic material readily allowing the formation of fairly complex shapes, are a front cover 12, a rear cover 14, an intermediate plate 16, extending between the covers 12, 14, a pushbutton 18, and a stopper 20. The stopper 20 is preferably rotationally disengageable and engageable, being manually removed to allow the introduction of new material, such as peppercorns or other spices. When pushbutton 18 is depressed, in the direction of arrow 22, the process of grating this material is begun, to be continued as long as pushbutton 18 is held down.

Figure 2:
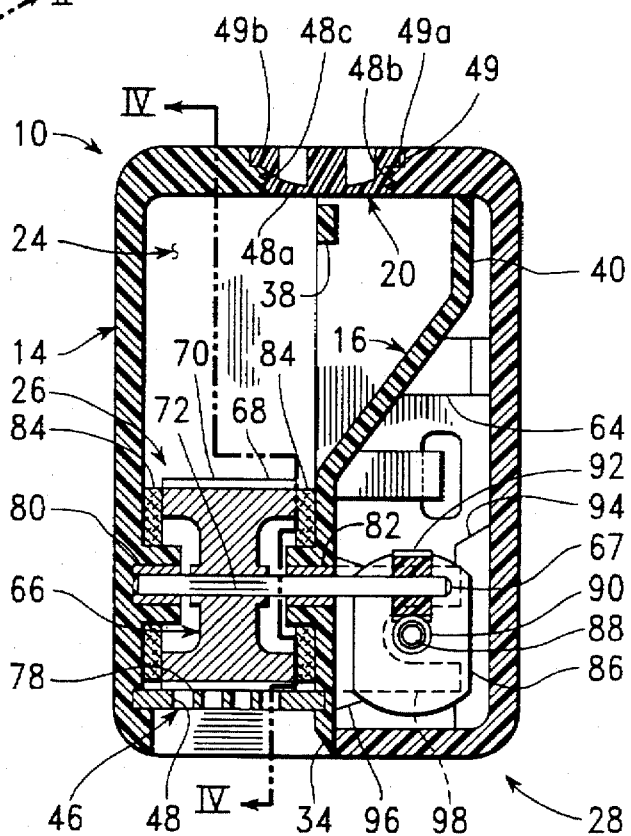
FIG. 2 is a vertical cross-sectional view of the spice mill of FIG. 1, taken as indicated by section lines II—II in FIG. 1 to show the construction of a hopper within the spice mill of FIG. 1.

FIG. 2 is a vertical cross sectional view of the spice mill 10, taken as indicated by section lines II—II in FIG. 1 to show the construction of a hopper 24, in which material, such as peppercorns, is held before grating, a grating mechanism 26, and a drive mechanism 28.

Figure 3:
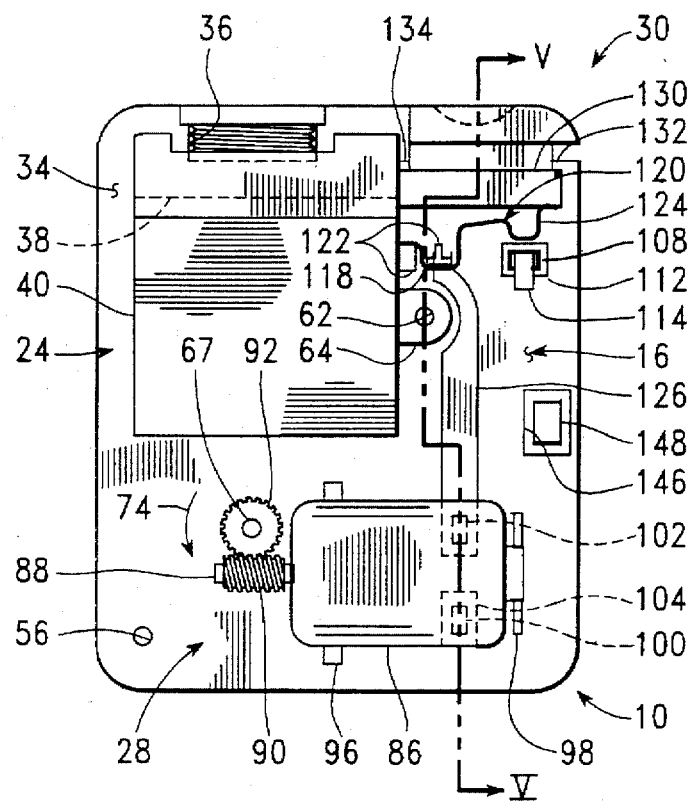
FIG. 3 is a front elevational view of the spice mill of FIG. 1, as viewed with a front cover removed from the mill to reveal details of an intermediate plate, an electrical switching mechanism, and a mechanical drive mechanism.

FIG. 3 is a front elevational view of the spice mill 10, as viewed with front cover 12 removed to reveal details of intermediate plate 16, drive mechanism 28, and an electrical switching mechanism 30 operated by the depression of pushbutton 18.

Figure 4:
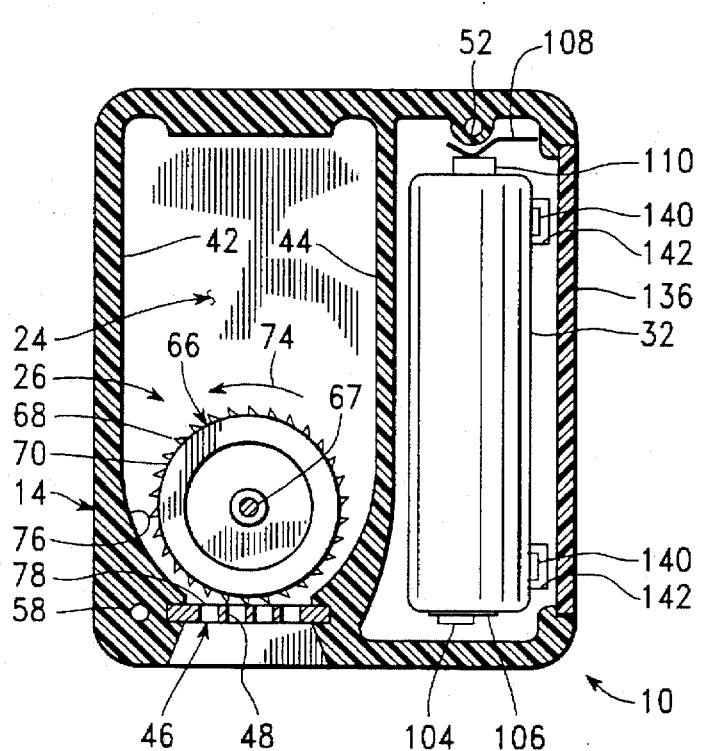
FIG. 4 is a vertical cross-sectional view of the spice mill of FIG. 1, taken as indicated by section lines IV—IV in FIG. 2 to show additional details of the hopper, of a grating mechanism, and of a battery compartment.

FIG. 4 is a vertical cross-sectional view of the spice mill 10, taken as indicated by cross-section lines IV—IV in FIG. 2 to show more details of the hopper 24, grating mechanism 26, and a battery 32.

The hopper 24, which will now be discussed with reference to FIGS. 2–4, is formed within a space generally defined by rear cover 14 and intermediate plate 16, extending below stopper 20. Intermediate plate 16 includes a flange portion 34, extending around the periphery of rear cover 14, except as interrupted by a hole 36 allowing the insertion of stopper 20. Below the hole 36, a strip portion 38 of intermediate plate 16, extending inward from flange portion 34, prevents finger access to the sharp surfaces of grating mechanism 26. The capacity of hopper 24 is increased by the configuration of intermediate plate 16, which includes an outward-extending portion 40 above drive mechanism 28. The sides of hopper 24 are formed by a peripheral end wall portion 42 and intermediate wall portion 44 of rear cover 14. The lower end of hopper 24 is formed by a lower plate 46 having a number of slots 48 through which ground pepper or spice is expelled.

Referring to FIG. 2, the stopper 20 includes an externally threaded portion 48a engaging mating internal threads 48b in front cover 12 and mating internal threads 48c in rear cover 14, as a flange portion 49 of stopper 20 is brought into contact with arcuate surface 49a of front cover 12 and arcuate surface 49b of rear cover 14.

Figure 5:
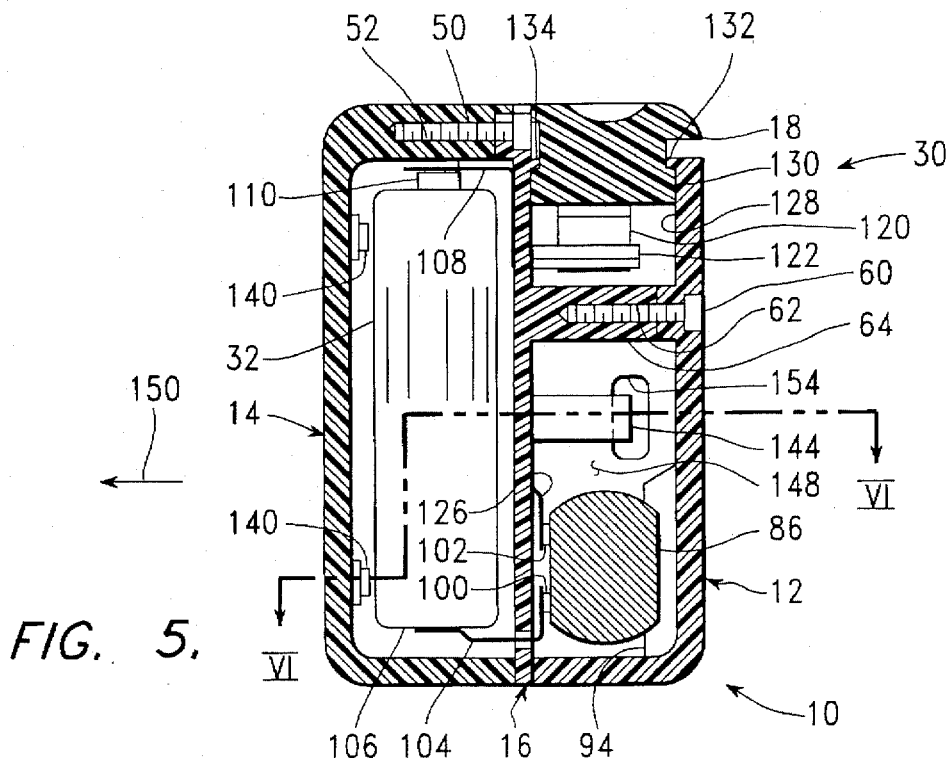
FIG. 5 is a vertical cross-sectional view of the spice mill of FIG. 1, taken as indicated by section lines V—V in FIG. 3 to show details of a housing construction and of the electrical switching mechanism.

FIG. 5 is a vertical cross-sectional view of the spice mill 10, taken as indicated by section lines V—V in FIG. 3 to show the attachment of intermediate plate 16 to rear cover 14 and to front cover 16, and to show additional details of electrical switching mechanism 30.

Referring to FIGS. 1, 3, and 5, intermediate plate 16 is fastened to rear cover 14 by means of an upper right screw 50 engaging an upper right hole 52 within the rear cover 14. At the opposite corner, front cover 12, intermediate plate 16, and rear cover 14 are clamped together by a lower left screw 54 (shown in FIG. 1) extending through a clearance hole 56 in intermediate plate 16 to engage a hole 58 in rear cover 14. The front cover 12 is also attached to intermediate plate 16 by means of a central screw 60 extending into a hole 62 within a boss 64 forming a portion of the intermediate plate 16. In this assembly process, a seal is formed around hopper 24, between intermediate plate 16 and rear plate 14, preventing the outward migration of pepper or spices, except as desired through the slots 48 in lower plate 46.

The grating mechanism 26 will now be discussed, referring again to FIGS. 2 and 4. A grating wheel 66, attached to a drive shaft 67, includes a number of flutes 68 extending along its outer surface 70 parallel to the drive shaft 67. The grating wheel 66, which is preferably composed of a die-cast metal, is pressed into place over a knurled portion 72 of drive shaft 67. When the grating wheel 66 is rotated in the direction of arrow 74, ungrated and partially-grated material (not shown), such as peppercorns or spices, is dragged by contact with the flutes 68 into a first narrowing gap formed between grating wheel 66 and the curved inner surface 76 of peripheral wall 42, and into a second narrowing gap between grating wheel 66 and the upper surface 78 of lower plate 46. As the peppercorns or other spices are dragged in this manner, portions thereof are shaved off, or broken away, by sharp external edges of flutes 68. This process continues, for example with an individual peppercorn being brought into repeated contact with flutes 70, until the remaining portion thereof is small enough to pass through the gap between grating wheel 66 and upper surface 78 of lower plate 46, or through one of the slots 48 in the lower plate 46. These slots 48 are sized to ensure that particles passing therethrough are small enough to be considered adequately grated particles of pepper or spices.

The drive shaft 67 is rotatably mounted within a rear bearing 80 in rear cover 14 and within an intermediate bearing 82 in intermediate plate 16. A pair of end seals 84, each of which is composed of a compliant material, such as felt, prevents the migration of ground and ungrated pepper or spices into the bearings 80, 82.

The drive mechanism 28 will now be described, with continuing reference to FIG. 2 and additional reference to FIG. 3. Mechanical power for the grating process is derived through a permanent-magnet, direct-current motor 86, having an output shaft 88 to which a worm gear 90, used as a drive gear, is attached. This worm gear 90 meshes with a worm wheel 92, used as a driven gear, attached to drive shaft 67, so that, when motor 86 is electrically turned on, drive shaft 67 is turned in the direction of arrow 74 at a speed reduced from the rotational speed of motor shaft 88. When front cover 12 is fastened in place on intermediate plate 16, motor 86 is clamped in place by a pair of cradle portions 94 extending inward from the front cover 12, and by cradle portions 96, 98 extending outward from the intermediate plate 16.

The electrical switching mechanism 30 will now be discussed, continuing to refer to FIG. 3, and referring again to FIGS. 4 and 5. Motor 86 includes a lower motor terminal 100 and an upper motor terminal 102, across which an appropriate voltage is applied to cause rotation of output shaft 88. A lower contact spring 104 extends between lower motor terminal 100 and a lower battery terminal 106 of battery 32, maintaining electrical contact between these lower terminals 100, 106. An upper contact spring 108 extends from an upper battery terminal 110, through an aperture 112 in intermediate plate 16 and along an upper contact support 114, which in turn extends outward as a portion of intermediate plate 16. A clamped end 118 of an intermediate contact spring 120 is held in place by a pair of intermediate clamp supports 122, also extending outward as portions of intermediate plate 16. The intermediate contact spring 120 is formed so that a free end 124 thereof extends upward, out of contact with upper contact spring 112, being deformed downward, into contact with upper contact spring 112 upon the depression of pushbutton 18. A descending strip 126 of intermediate contact spring 120 extends downward along intermediate plate 16 to make electrical contact with upper motor terminal 102.

Thus, an electrical circuit connection between motor 86 and battery 32, which is not made when pushbutton 18 is not depressed, is in fact made when the pushbutton 18 is depressed, bringing intermediate contact spring 124 into contact with the portion of upper contact spring 108 extending along contact support 114. Pushbutton 18 moves within a generally rectangular opening formed by inner surfaces 128 of front cover 12, and by guiding surfaces 129 of intermediate plate 16, which together extend along each side thereof. Pushbutton 18 is held upward by a force derived by the deflection of intermediate spring 120, with upward movement of the pushbutton 18 being limited by contact between a flange 130 extending outward from the pushbutton 18 and flanges 132 and 134 extending inward from front cover 12 and intermediate plate 16, respectively. Downward movement of the pushbutton 18 is limited by contact between intermediate contact spring 120 and upper contact spring 108.

Figure 6:
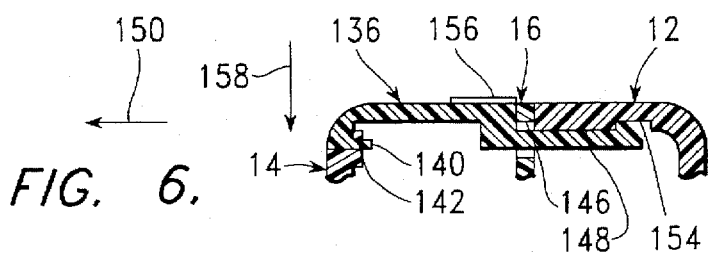
FIG. 6 is a fragmentary horizontal cross-sectional view of the housing of the spice mill of FIG. 1, taken as indicated by section lines VI—VI to show a access door to the battery compartment.

FIG. 6 is a fragmentary horizontal cross-sectional view, taken as indicated by section lines VI—VI in FIG. 5 to show an access door 136, which is used to provide access for changing the battery 32.

The access door 136 will now be discussed, with reference to FIGS. 3–6. During normal use of the spice mill 10, this access door 136 is held in place within a track 138, formed in rear cover 14, by means of tabs 140, extending inward through slots 142 of the rear cover 14, and by means of a latching tab 144 extending through an aperture 146 within intermediate plate along an inner surface 148 of front cover 12. Movement of the access door 136 in the direction of arrow 150 is prevented by the engagement of a tooth 152 of latching tab 144 within a slot 154 of front cover 12.

Access to the battery 32 for removal and replacement thereof is gained by removing access door 136. This is achieved by depressing a raised surface 156 of access door 136 inward, in the direction of arrow 158, until tooth 152 disengages from slot 154, and by sliding the door 136 in the direction of arrow 150, pulling tabs 140 out of slots 142. Subsequently, the access door 136 is replaced by movement along the track 138 in the direction opposite that of arrow 150, so that tooth 152 is re-engaged with slot 154 and so that tabs 140 are re-engaged with slots 142.

Figures 7, 8:
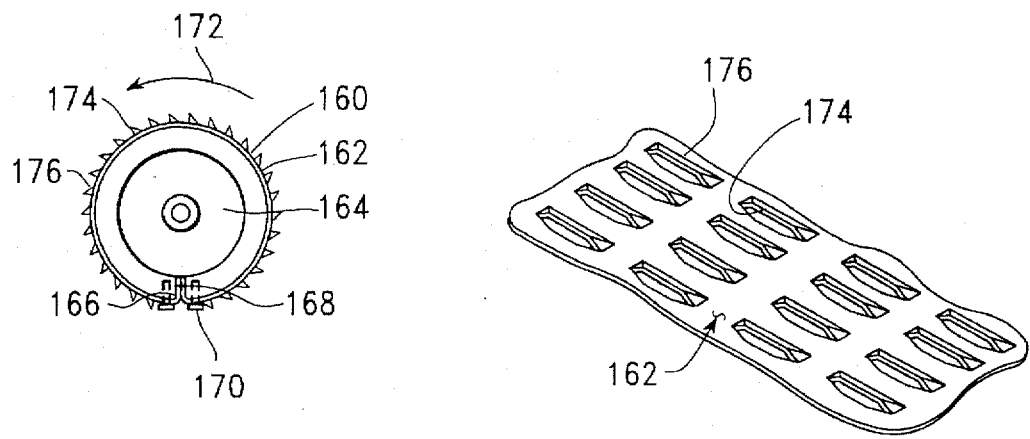
FIG. 7 is an end elevational view of an alternative grating wheel for the spice mill of FIG. 1.
FIG. 8 is a fragmentary isometric view of a cover of the alternative grinding wheel of FIG. 7.

FIG. 7 is an end elevational view of an alternative grating wheel 160, which can replace the grating wheel 66 (shown in FIGS. 2 and 4) in a spice mill 10 otherwise as described above. While grating wheel 66 is preferably composed entirely of a metallic material to withstand the forces generated in the grating process, alternative grating wheel 160 is preferably composed of a metallic cover 162 wrapped around the periphery of a plastic hub 164. End portions 166 of the metallic cover 162 fit within a slot 168 of the hub 164, and the cover 162 is held in place on the hub 162 by means of a pair of rivets 170. Alternative grinding wheel 160 is configured to be driven in the direction indicated by arrow 172, with sharp edges 174 being exposed radially outwardly and in the direction of rotation.

FIG. 8 is an isometric view of a portion of the cover 162 of wheel 160, as seen before the cover is curved to be wrapped around or slid over the wheel. Grating edges are provided by a number lanced and formed tabs 176, which extend outward to present sharp edges 174 to the material being grated.

The advantages of the present invention compared to the background art arise from the relatively small size and weight of the present invention, which allow it to be easily carried about in a pocket or purse, for example, into a restaurant. This small size is achieved through the use of a drive mechanism which economizes in space and through the use of a grating mechanism, which minimizes the power required to produce flakes of pepper or other spice material, by repeatedly presenting sharp cutting edges to the peppercorns or other spice particles entrapped within the grating mechanism. This process fosters cutting, or grating, in place of crushing. The drive mechanism minimizes the space required by providing a right-angle relationship between motor shaft 88 and the drive shaft 67 to which grating wheel 70 is attached, with both these shafts 88, 67 extending horizontally. In a spice mill built according to various aspects of the present invention, the motor 86 and grating wheel 66 lie near the bottom of the unit, adjacent one another.

The small size and weight of a spice mill built in accordance with the present invention also allows a restaurant, or the hostess of a party, to provide several different spices in different spice mills for use by guests.

On the other hand, in each of the prior art examples of U.S. Pat. Nos. 3,734,417, 4,925,150, and 5,022,591, the grinding rotor is disposed at one end of the device, being rotated about a vertical axis, while the motor is displaced vertically from the grinding rotor, having an output shaft also rotating along a vertical axis to drive the grinding rotor through a gear train and an elongated shaft extending through the chamber holding peppercorns or other spices awaiting the grinding process. While this design is suitable for the large units described in these prior art patents, it is not suitable in a unit being configured to be easily carried in a pocket or purse, since a large vertical length is required for the motor, shaft, and grinding rotor.

While the invention has been described in its preferred form or embodiment With some degree of particularity, it is understood that this description has been given only by way of example and that numerous changes in the details of construction, fabrication and use, including the combination and arrangement of parts, may be made without departing from the spirit and scope of the invention.

What is claimed is:

1. A portable spice mill comprising:

a battery;

a manually operated electric switch electrically connected to said battery;

an electric motor electrically connected to said electric switch and to said battery, powered by said battery when contacts within said electric switch are held together, wherein said motor includes an output shaft extending outward in a first direction from an end of said motor, with a drive gear attached to said output shaft;

a wheel for grating spices, wherein said wheel is attached to a drive shaft having a driven gear in meshing engagement with said drive gear, with said wheel being driven in a direction of wheel rotation by said motor, and wherein said drive shaft extends horizontally, with said wheel rotating within a lower portion of a hopper holding said spices and supplying said spices to said wheel; and a housing surrounding said battery, motor, wheel, and hopper, with said housing including a loading opening above said hopper and a discharge opening below said wheel.

2. The spice mill of claim 1:

wherein said wheel includes an outer, generally cylindrical surface with a plurality of flutes extending therealong in a said second direction, with each said flute having a sharp edge directed radially outward and in said direction of wheel rotation;

wherein said hopper includes a lower portion having a plurality of apertures through which grated spices can pass; and wherein said wheel is mounted to rotate within said hopper above said lower portion.

3. The spice mill of claim 2, wherein said lower portion defines a lower gap with said outer, generally cylindrical surface of said wheel, with said lower gap decreasing in said direction of wheel rotation.

4. The spice mill of claim 3, wherein a surface of said hopper adjacent said wheel forms an upper gap with said outer, generally cylindrical surface of said wheel, with said upper gap decreasing in said direction of wheel rotation.

5. The spice mill of claim 2, wherein said wheel is composed of metal.

6. The spice mill of claim 2, wherein said wheel includes:

a plastic hub having a cylindrical outer hub surface; and a sheet metal cover extending around said cylindrical outer hub surface, with each flute within said plurality thereof being a portion of said sheet metal cover formed outward to expose a cut edge outwardly and in said direction of wheel rotation.

7. The spice mill of claim 1;

wherein said output shaft extends outward from said motor in a first direction;

wherein said drive shaft extends from said driven gear to said wheel in a second direction perpendicular to said first direction; and wherein said hopper additionally extends opposite said second direction and upward in a third direction above said drive gear and said driven gear.

8. The spice mill of claim 7 wherein said battery is displaced from said motor in said second direction and from said hopper opposite said first direction, wherein said battery extends upward in said third direction, and wherein said housing is generally rectangular, being configured to fit within a clothing pocket.

9. The spice mill of claim 8, wherein said housing includes:

a rear cover forming first wall surfaces defining said hopper and extending around said battery;

an intermediate plate forming second wall surfaces further defining said hopper; and a front cover extending around said electric switch and said motor.

10. The spice mill of claim 9, wherein said electrical switch includes:

a stationary contact electrically connected to a terminal of said battery, extending along a first contact support structure of said intermediate plate;

a flexible contact electrically connected to a terminal of said motor, extending above said stationary contact, in a spaced-apart relationship with said stationary contact;

a button slidably mounted within an aperture of said front cover above said flexible contact, wherein depression of said button deflects said flexible contact into contact with said stationary contact to electrically connect said terminal of said battery with said terminal of said motor.

11. Apparatus for grating spices, wherein said apparatus comprises:

a wheel mounted to rotate about a central axis in a direction of wheel rotation, including an outer, generally cylindrical surface with a plurality of flutes extending therealong parallel to said central axis, with each said flute having a sharp edge directed radially outward and in said direction of wheel rotation, with said central axis being horizontal;

a hopper supplying spices to said wheel from above said wheel, with said hopper extending around and above said wheel; and a lower plate, extending adjacent and under said wheel, forming a lower portion of said hopper with said lower plate including a plurality of apertures through which grated spices can pass.

12. The apparatus of claim 11, wherein said hopper extends around said wheel to said lower plate.

13. The apparatus of claim 12, wherein said lower plate defines a lower gap with said outer, generally cylindrical surface of said wheel, with said lower gap decreasing in said direction of wheel rotation.

14. The apparatus of claim 12, wherein a surface of said hopper adjacent said wheel forms an upper gap with said outer, generally cylindrical surface of said wheel, with said upper gap decreasing in said direction of wheel rotation.

15. The apparatus of claim 11, wherein said wheel is composed of metal.

16. The apparatus of claim 11, wherein said wheel includes:

a plastic hub having a cylindrical outer hub surface; and a sheet metal cover extending around said cylindrical outer hub surface, with each flute within said plurality thereof being a portion of said sheet metal cover formed outward to expose a cut edge outwardly and in said direction of wheel rotation.

17. The apparatus of claim 11, comprising additionally:

a battery;

an electric switch connected to said battery;

an electric motor electrically connected to said electric switch and to said battery, powered by said battery when contacts within said electric switch are held together, wherein said motor drives said wheel to rotate in said direction of wheel rotation, and a housing.

18. The apparatus of claim 17:

wherein said wheel is attached to a rotatable drive shaft;

wherein said motor drives said rotatable drive shaft through a meshing pair of gears, with said motor extending perpendicularly from an end of said drive shaft; and wherein said housing includes a rear cover forming first wall surfaces defining said hopper and extending around said battery, an intermediate plate forming second wall surfaces further defining said hopper, and a front cover extending around said electric switch and said motor.

* * * * *